United States Patent
Ban et al.

(10) Patent No.: US 9,656,213 B2
(45) Date of Patent: May 23, 2017

(54) METHOD OF PRODUCING MICROPOROUS POLYMER MEMBRANE AND MICROPOROUS POLYMER MEMBRANE PRODUCED BY THE METHOD

(75) Inventors: Jeong-Won Ban, Seoul (KR);
Kyu-Chul Kim, Icheon-si (KR);
Hyun-Il Kim, Wonju-si (KR)

(73) Assignee: CS TECH CO., LTD., Wonju-si (KR)

( * ) Notice: Subject to any disclaimer, the term of this patent is extended or adjusted under 35 U.S.C. 154(b) by 200 days.

(21) Appl. No.: 13/129,640

(22) PCT Filed: Apr. 1, 2010

(86) PCT No.: PCT/KR2010/002010
§ 371 (c)(1),
(2), (4) Date: May 17, 2011

(87) PCT Pub. No.: WO2010/120056
PCT Pub. Date: Oct. 21, 2010

(65) Prior Publication Data
US 2011/0223407 A1    Sep. 15, 2011

(30) Foreign Application Priority Data
Apr. 17, 2009 (KR) .......... 10-2009-0033466

(51) Int. Cl.
*B01D 67/00* (2006.01)
*B29C 55/14* (2006.01)
(Continued)

(52) U.S. Cl.
CPC ....... *B01D 67/002* (2013.01); *B01D 67/0027* (2013.01); *B01D 69/02* (2013.01); *B01D 71/26* (2013.01); *H01M 2/1653* (2013.01); *B01D 67/0023* (2013.01); *B01D 67/0025* (2013.01); *B01D 67/0083* (2013.01);
(Continued)

(58) Field of Classification Search
CPC ...... B01D 67/002; B01D 69/02; B01D 71/26; B01D 67/0027; B01D 67/0083; B01D 67/0023; B01D 67/0025; B01D 2325/04; B01D 2325/24; B01D 2325/021; B01D 2325/02; H01M 2/1653; H01M 10/052; B29C 55/143
See application file for complete search history.

(56) References Cited

U.S. PATENT DOCUMENTS 3,611,479 A * 10/1971 Wicksall ..................... 26/89
3,801,692 A * 4/1974 Zimmerman ............. 264/154
(Continued)

*Primary Examiner* — Jeffrey Wollschlager
(74) *Attorney, Agent, or Firm* — Novick, Kim & Lee, PLLC; Jae Youn Kim

(57) ABSTRACT

Disclosed is a method of producing a microporous polymer membrane, comprising: providing a polymer material; melting the polymer material; forming a precursor film by cooling and crystallizing the molten polymer material using an air knife; extending the precursor film; annealing the extended precursor film, primary stretching the annealed precursor film; forming a preliminary membrane by subjecting the primary stretched film to secondary stretching at a high temperature, and forming a microporous polymer membrane by heat setting the preliminary membrane. A microporous polymer membrane produced by the method is also provided.

9 Claims, 5 Drawing Sheets

(51) Int. Cl.
  *B01D 69/02*  (2006.01)
  *B01D 71/26*  (2006.01)
  *H01M 2/16*  (2006.01)
  *H01M 10/052*  (2010.01)

(52) U.S. Cl.
  CPC .... *B01D 2325/02* (2013.01); *B01D 2325/021* (2013.01); *B01D 2325/04* (2013.01); *B01D 2325/24* (2013.01); *B29C 55/143* (2013.01); *H01M 10/052* (2013.01)

(56) References Cited

U.S. PATENT DOCUMENTS

| | | | | |
|---|---|---|---|---|
| 4,707,314 | A * | 11/1987 | Kawahigashi | B29C 43/006 264/127 |
| 5,246,647 | A * | 9/1993 | Beck et al. | 264/41 |
| 5,328,760 | A * | 7/1994 | Gillberg-LaForce | 428/315.5 |
| 5,385,777 | A * | 1/1995 | Higuchi et al. | 428/316.6 |
| 5,800,758 | A * | 9/1998 | Topolkaraev | B29C 55/005 264/154 |
| 6,540,953 | B1 * | 4/2003 | Lee | B01D 67/003 264/210.3 |
| 2003/0180525 | A1 * | 9/2003 | Strack | A61F 13/51462 428/323 |
| 2004/0191522 | A1 * | 9/2004 | Haring | B01D 67/0027 428/411.1 |
| 2007/0196638 | A1 * | 8/2007 | Wei | B01D 67/0027 428/304.4 |

* cited by examiner

200

METHOD OF PRODUCING MICROPOROUS POLYMER MEMBRANE AND MICROPOROUS POLYMER MEMBRANE PRODUCED BY THE METHOD

TECHNICAL FIELD

The present invention relates to a method of producing a microporous polymer membrane and a microporous polymer membrane produced by the method. More specifically, the present invention relates to a microporous polymer membrane which is produced through melt extension and biaxial stretching using an air knife and a biaxial extending device, and to a method of producing the same.

BACKGROUND ART

Microporous membranes are widely used in various fields including medical dialysis, environmental filtration, food purification and so on. Recently, microporous membranes are being utilized as a separator for a lithium secondary battery (e.g. lithium ion battery, lithium polymer battery, etc.). In particular, microporous membranes adapted for a lithium polymer battery play a role not only as cathode and anode separators but also as an ion conductive medium, namely, an electrolyte. The microporous membrane used as the separator and the electrolyte for a battery may be mainly produced from polyolefinic resin. In the case where a polyolefinic resin having high crystallinity, such as polyethylene and polypropylene, is used as a separator for a lithium secondary battery, tensile strength, rigidity, and impact strength of the separator may be enhanced, and as well ion permeability may be greatly increased.

The production of the microporous membrane from the polyolefinic resin may include the use of a precursor film. The production of the microporous membrane using a film may include for example MCS (Melt Casting and Stretching: 1 phase), thermally-induced phase separation (2 phase), and phase inversion (3 phase). Particularly useful are MSS using only a polymer without the use of a solvent based on a dry process, and thermally-induced phase separation essentially using a polymer, a solvent and an extracting agent based on a wet process.

In the dry process, dry production (hereinafter, referred to as "uniaxial dry stretching") for forming micropores through uniaxial stretching is very economical because the production process is simple and thus mass production is possible, and is advantageous because it may enhance tensile strength in a machine direction (MD), and is environmentally friendly thanks to an organic solvent not being used. However, this method is disadvantageous because tensile strength in a transverse direction (TD) is low due to unidirectional orientation of polymer chains through uniaxial stretching.

On the other hand, the wet process for producing a microporous composite membrane using a solvent causes environmental problems due to the use of the organic solvent. Furthermore, the wet process is problematic because high ion conductivity cannot be expected attributable to the remainder of the solvent used for phase separation and the limitation in pore size determined thereby.

Thus, there is required a microporous composite membrane which is manufactured using a method such as uniaxial dry stretching that is environmentally friendly and economical, and also which satisfies both mechanical strength and ion conductivity like a triple membrane structure using a first porous polymer, a second gelling polymer and a plasticizer.

DISCLOSURE OF INVENTION

Technical Problem

An object of the present invention is to provide a microporous polymer membrane and a method of producing the same, in which a high winding speed may be imparted through forced cooling by external air.

Another object of the present invention is to provide a microporous polymer membrane and a method of producing the same, in which a thin film is easily formed, and shaking of the film is minimized thus improving dimensional stability.

A further object of the present invention is to provide a microporous polymer membrane and a method of producing the same, in which biaxial dry stretching is performed in order to reinforce TD strength which is much weaker than MD strength resulting from using conventional uniaxial dry stretching, thus enhancing strength in both MD and TD of a final membrane.

Solution to Problem

In order to accomplish the above objects, the present invention provides a method of producing a microporous polymer membrane, comprising: providing a polymer material; melting the polymer material; forming a precursor film by cooling and crystallizing the molten polymer material using an air knife; extending the precursor film; annealing the extended precursor film, primary stretching the annealed precursor film at a low temperature; forming a preliminary membrane by subjecting the primary stretched film to secondary stretching at a high temperature; and forming a microporous polymer membrane by heat setting the preliminary membrane.

Advantageous Effects of Invention

According to the present invention, a method of producing a microporous polymer membrane enhances weak TD strength thus ensuring good mechanical strength for both MD and TD. In addition, the method of producing a microporous polymer membrane according to the present invention enables forced cooling by the external air, thus imparting a high winding speed and ensuring a high degree of orientation. In addition, the method of producing a microporous polymer membrane according to the present invention facilitates the formation of a thin film, and minimizes the shaking of the film thus improving dimensional stability. Furthermore, because polymer chains can be oriented in MD and TD in the courses of extending and hot stretching, the mechanical strength of the membrane in MD and TD can be enhanced.

BEST MODE FOR CARRYING OUT THE INVENTION

Figure 1:
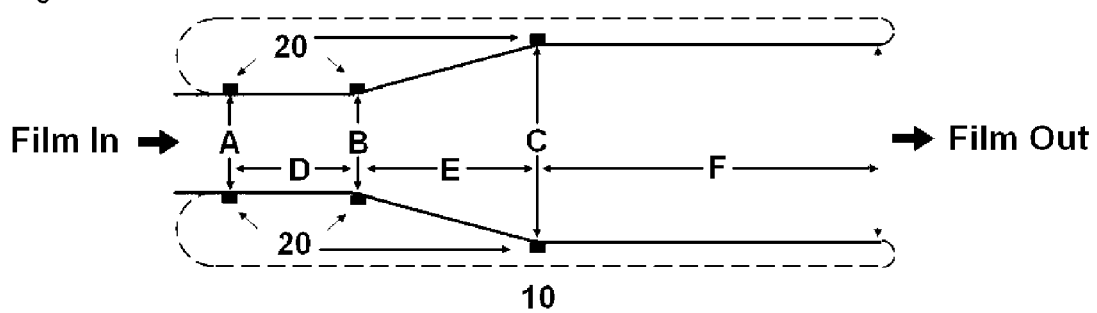
FIG. 1 is a schematic view showing a biaxial extending device useful in the extending the precursor film of a method of producing a microporous polymer membrane according to the present invention.

An aspect of the present invention provides a method of producing a microporous polymer membrane, comprising: providing a polymer material; melting the polymer material; forming a precursor film by cooling and crystallizing the molten polymer material using an air knife; extending the precursor film; annealing the extended precursor film; primary stretching the annealed precursor film at a low temperature; forming a preliminary membrane by subjecting the primary stretched film to secondary stretching; and forming a microporous polymer membrane by heat setting the preliminary membrane.

In this aspect, the extending the precursor film may be performed using a biaxial extending device.

In this aspect, the forming a preliminary membrane may comprise: preparing slit-like pores by subjecting the primary stretched film to uniaxial dry stretching in a machine direction; and forming the preliminary membrane by subjecting the film having the slit-like pores to biaxial dry stretching in a transverse direction perpendicular to the machine direction of the uniaxial dry stretching so that the slit-like pores are enlarged to spherical pores having a diameter of a pore of 0.05~1 μm.

In this aspect, the preparing slit-like pores may be performed using a uniaxial dry stretching device composed of a chamber, a feed roll which is disposed outside the chamber and to feed the film into a stretch roll, and a plurality of the stretch rolls which is disposed to be spaced apart from each other by a predetermined interval at both sides outside the chamber and to feed the film into the chamber from the feed roll, and a winder which is disposed outside the chamber and to wind the film passed through the stretch rolls.

In this aspect, the forming the preliminary membrane may be performed using a biaxial extending device.

Another aspect of the present invention provides a microporous polymer membrane, having a diameter of a pore of 0.05~1 μm, a porosity of 30~70%, a tensile strength of 400~3,000 kgf/cm², and a thickness of 10~50 μm.

In this aspect, the microporous polymer membrane may include at least one selected from the group consisting of ultrahigh molecular weight polyethylene, high molecular weight polyethylene, high density polyethylene, low density polyethylene, linear low density polyethylene, polypropylene, high crystalline polypropylene, and polyethylene-propylene copolymer.

In this aspect, the microporous polymer membrane may be used for a lithium battery.

MODE FOR THE INVENTION

Hereinafter, a detailed description will be given of the present invention.

According to the present invention, a method of producing a microporous polymer membrane comprises providing a polymer material.

The polymer material is not particularly limited as long as it is used in the art, and may include at least one selected from among ultrahigh molecular weight polyethylene, high molecular weight polyethylene, high density polyethylene, low density polyethylene, linear low density polyethylene, polypropylene, high crystalline polypropylene, and polyethylene-propylene copolymer.

In the case where the polymer material includes two or more constituents, these constituents may be mixed using at least one selected from among a Henschel mixer, a Banbury mixer, and a Planetary mixer. As such, an additive may be further included in order to produce pores in a subsequent procedure. The additive is not particularly limited as long as it is known in the art.

According to the present invention, the method of producing a microporous polymer membrane comprises melting the polymer material.

The melting process is not particularly limited as long as it is used in the art, and may be performed at 190~250° C. using a single- or twin-screw extruder.

According to the present invention, the method of producing a microporous polymer membrane comprises forming a precursor film by cooling and crystallizing the molten polymer material using an air knife.

The molten polymer material may be fed in a predetermined amount using a melt pump. The molten polymer material is extruded using a T-die, and forcedly cooled and crystallized by cold air sprayed using a straight air knife, thus forming the precursor film. As such, the film is pulled by a take-up roll at a predetermined speed and thus becomes thin. The temperature of the air sprayed from the air knife may be –20-40° C. If air below –20° C. is sprayed, both the molten polymer material and the T-die may be cooled together, thus making it difficult to stably extrude the polymer material. In contrast, if air above 40° C. is sprayed, rapid cooling effects are decreased and the film is not completely cooled before being brought into contact with the tape-up roll, thus wrinkling the film produced in the forming a precursor film, undesirably making it difficult to form a stable film.

The film produced in the forming a precursor film is imparted with a high winding speed in MD because of the use of the air knife, so that the orientation of polymer chains is maximized. Also, the film may have improved thin film formability and superior thickness uniformity with a thickness variation of about ±1 μm.

According to the present invention, the method of producing a microporous polymer membrane comprises extending the precursor film.

In the extending the precursor film, a biaxial extending device may be used. The use of the biaxial extending device enables the polymer chains of the precursor film to be oriented in MD and TD, thereby enhancing the strength of the film.

FIG. 1 schematically shows the biaxial extending device used in the extending the precursor film.

With reference to FIG. 1, the biaxial extending device includes a first winding shaft (not shown) on which the precursor film is wound, a chain 10 for rotating the precursor film fed from the first winding shaft, a plurality of clips 20 which is disposed to be spaced apart from by predetermined intervals and to hold the precursor film, a second winding shaft (not shown) for winding the precursor film passed through the chain, and a motor (not shown) for rotating the first and second winding shafts.

The clips 20 may be positioned at points A, B, C in the chain 10, in which point A may be positioned in the range of 300~700 mm, point B may be positioned in the range of 300~1,000 mm, and point C may be positioned in the range of 300~1,500 mm. Also, the section D between A (chain start point) and B may be positioned in the range of 200~400 mm, the section E between B and C may be positioned in the range of 1,000~2,000 mm, and the section F between C and the chain stop point may be positioned in the range of 2,700~3,700 mm.

The biaxial extending device may be driven at a line speed of 5~20 m/min, and may control the temperature (max. temperature: 200° C.±1 in the effective zone) using vertical hot-air forced circulation.

Subsequently, enhancing the strength of the extended precursor film in which the polymer chains of the film are oriented in MD and TD may be further included.

According to the present invention, the method of producing a microporous polymer membrane comprises annealing the extended precursor film. The annealing process is carried out in order to increase crystallinity and elastic modulus of the extended precursor film, and may be performed at a temperature equal to or lower than the melting point of the extended precursor film. The annealing process is not particularly limited as long as it is known in the art, and a dry oven or a hot plate may be used.

According to the present invention, the method of producing a microporous polymer membrane comprises primary stretching at a low temperature the annealed precursor film. In the primary stretching, uniaxial dry stretching may be performed at temperature equal to or lower than room temperature using a roll or other stretching devices.

When the uniaxial dry stretching is performed, the polymer crystal structure uniformly formed on the film is broken by moment stress, thereby forming microcracks from which pores starts to be formed. Upon the uniaxial dry stretching, if the stretch ratio is too low, it is difficult to uniformly stretch the film, and thus the film should be stretched at a predetermined ratio or more. When the thickness of the film is 40 μm, the stretch portion and the non-stretch portion may be formed at a stretch ratio below about 50% and thus the stretch ratio for cold stretching should be ensured to 50% or more. However, if the film is cold stretched at too high a stretch ratio (200% or more), it may be disrupted, and so, an appropriate stretch ratio is required.

According to the present invention, the method of producing a microporous polymer membrane comprises forming a preliminary membrane by subjecting the cold stretched film to dry biaxial hot stretching.

In the method, the forming a microporous polymer membrane comprises forming slit-like pores by subjecting the primary stretched film to uniaxial dry stretching in MD, and forming a preliminary membrane by subjecting the film having the slit-like pores to biaxial dry stretching in TD perpendicular to the MD of the uniaxial dry stretching, thus enlarging the slit-like pores into spherical pores having a pore size of 0.05~1.

In the forming slit-like pores, the primary dry stretching may be uniaxial dry stretching at a high temperature.

Upon the uniaxial dry stretching at a high temperature, the microcracks, which were formed upon the primary stretching, are enlarged, thus developing the slit-like pores having an average diameter of a pore of 0.05~0.1 μm and a porosity of 30% or more.

As such, the thickness of the primary stretched film may be reduced in inverse proportion to an increase in the stretch ratio. For example, in the case where the film having a thickness of 32 μm is subjected to uniaxial dry stretching at a high temperature to about 300%, a microporous polymer membrane having a thickness of 20 μm may be formed as a final product. Specifically, because the polymer membrane has greater porosity and pore size at a thinner thickness, it is easy to pass liquid and gas through the microporous polymer membrane according to the present invention and to control the passing rate.

Figure 2:
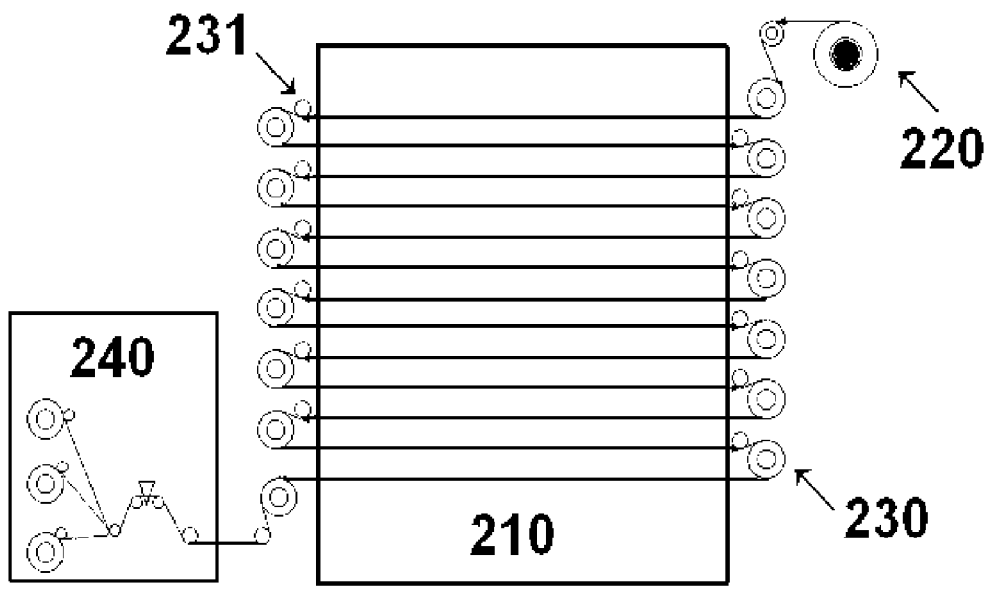
FIG. 2 is a schematic view showing a uniaxially stretching device useful for uniaxial dry stretching in the primary stretching the annealed precursor film of the method of producing a microporous polymer membrane according to the present invention.

FIG. 2 schematically shows a uniaxial stretching device which performs the uniaxial dry stretching.

With reference to FIG. 2, the uniaxial stretching device 200 comprises a chamber 210, a feed roll 220 which is disposed outside the chamber 210 and to feed the film into a stretch roll, a plurality of the stretch rolls 230 which is disposed to be spaced apart from each other by a predetermined interval at both sides outside the chamber 210 and to feed the film into the chamber 210 from the feed roll 220, and a winder 240 which is disposed outside the chamber 210 and to wind the film passed through the stretch rolls.

The stretch rolls 230 of the uniaxial stretching device may be provided with assistant rolls 231 in order to more efficiently hold the film. The chamber 210 may include microslits so that the film is fed into and removed from the chamber 210 through the stretch rolls 230. Furthermore, because the inner pressure of the chamber 210 should be maintained to be positive in order to prevent the inflow of external air, a heater, a forced circulation fan (not shown), and intake and exhaust ports may be provided.

The inside of the chamber 210 may be layered due to the film positioned on the stretch rolls 230. In order to maintain the temperature uniformity per layer, hot air passages may be provided at the front and rear of the chamber. Because the stretch rolls 230 are positioned outside the chamber 210, an additional cooling device is not needed, and the air flow in the chamber 210 is not interrupted, thus improving process efficiency and temperature uniformity.

In the case where the uniaxial stretching device is used, film thickness, gas permeability, thermal shrinkage and outer appearance may vary depending on the temperature uniformity of the device, as shown in Table 1 below. As such, the temperature is set to 110° C., and the thickness of the provided precursor film is 27 μm.

TABLE 1

| Temp. Uniformity (° C.) | Thick. Variation (μm) | Gas Permeability (LPM) | Thermal Shrinkage (Variation, %) | Outer Appearance |
|---|---|---|---|---|
| ±5 | 16~24 (±4) | 0~0.8 | 1~5 | Wrinkles |
| ±3 | 18~22 (±2) | 0.5~1.2 | 2~4 | No Wrinkles |
| ±1 | 19~20 (±1) | 2.0~3.0 | 3 | No Wrinkles |

As is apparent from Table 1, when the temperature uniformity is 0~±3, the film which is superior in all the properties may be provided.

After the uniaxial dry stretching, the biaxial dry stretching is performed in the direction perpendicular to the direction of the uniaxial dry stretching. As such, the biaxial dry stretching may be biaxial dry stretching at a high temperature. The biaxial dry stretching may be carried out at a stretch ratio of 5~100%, and preferably 50~100%. In the biaxial dry stretching, the slit-like pores resulting from the uniaxial dry stretching at a high temperature are formed into spherical pores and also the diameter of the pore and porosity are increased, resulting in an average diameter of the pore of 0.1~0.2 µm and a porosity of 30~70%. The thickness of the microporous polymer membrane after the biaxial dry stretching is similar to the thickness after the uniaxial dry stretching at a high temperature. This is because the stretch ratio increased upon the biaxial dry stretching contributes to the enlargement of the pores or the formation of new pores, without the thickness being reduced. The biaxial dry stretching which is additionally performed after uniaxial dry stretching at a high temperature makes it possible to achieve superior a diameter of a pore and porosity. Thus, the film resulting from the biaxial dry stretching allows liquid and gas to more easily pass therethrough and enables the passing rate to be more easily controlled, compared to the film resulting from the uniaxial dry stretching at a high temperature.

The biaxial dry stretching may be carried out using the biaxial extending device (FIG. 1) used in the extending the precursor film. In the section E of the biaxial extending device, secondary dry stretching of the precursor film is performed.

When the pores are formed in the forming a preliminary, the optimal pore structure depending on the structural properties of the polymer crystals may be ensured. Specifically, multi-stage stretching is applied, which includes uniaxial and biaxial dry stretching procedures for increasing the pore size by physically enlarging the microcracks, which were formed through the primary stretching, at a high temperature, ultimately attaining the optimal pore structure.

According to the present invention, the method of producing a microporous polymer membrane comprises the forming a microporous polymer membrane by heat setting the preliminary membrane. Specifically, the forming a microporous polymer membrane may be performed at a temperature equal to or lower than the melting point of the microporous polymer membrane for a predetermined period of time in a state of being subjected to tensile strength.

In addition, the present invention provides a microporous polymer membrane produced using the above method. The microporous polymer membrane has a diameter of a pore of 0.05~1 µm, and a porosity of 30~70%, a tensile strength of 400~3,000 kgf/cm², and a thickness of 10~50 µm. When these properties of the membrane fall in the above range, the microporous polymer membrane may have high gas and liquid permeability and may be applied to a variety of fields.

Also, the microporous polymer membrane may include at least one selected from among ultrahigh molecular weight polyethylene, high molecular weight polyethylene, high density polyethylene, low density polyethylene, linear low density polyethylene, polypropylene, high crystalline polypropylene and polyethylene-propylene copolymer.

The method of producing the microporous polymer membrane according to the present invention enables the forced cooling by external air, thus imparting a high winding speed. Also, the method of producing the microporous polymer membrane according to the present invention is favorable in terms of forming a thin film, and minimizes the shaking of the film, thus improving dimensional stability.

The microporous polymer membrane according to the present invention may be used for a lithium battery.

A better understanding of the present invention regarding the microporous polymer membrane may be obtained through the following examples which are set forth to illustrate, but are not to be construed as limiting the present invention.

Preparative Example 1 and Comparative Preparative Examples 1 and 2: Production of Precursor Film of Microporous Polymer Membrane Preparative Example 1

5 wt % of ultrahigh molecular weight polyethylene (weight average molecular weight: 2,500,000), 90 wt % of high density polyethylene (weight average molecular weight: 400,000), 3 wt % of Irganox 1010, and 2 wt % of polyethylene wax were blended at room temperature for 1 hour using a Henschel mixer thus preparing a polymer material. The polymer material was melted at 220° C. using a twin-screw extruder, after which the molten polymer resin was fed in a predetermined amount into a T-die through a melt pump and thus extruded. Subsequently, the extruded molten resin was forcedly cooled by spraying cold air using a straight air knife, and pulled by a take-up roll at a predetermined speed so as to be thinned, thus manufacturing a precursor film. The temperature of the air sprayed was −20° C.

Comparative Preparative Example 1

5 wt % of ultrahigh molecular weight polyethylene (weight average molecular weight: 2,500,000), 90 wt % of high density polyethylene (weight average molecular weight: 400,000), 3 wt % of Irganox 1010, and 2 wt % of polyethylene wax were blended at room temperature for 1 hour using a Henschel mixer thus preparing a polymer material. The polymer material was melted at 220° C. using a twin-screw extruder, after which the molten polymer resin was fed in a predetermined amount into a T-die through a melt pump and thus extruded. The extruded molten resin was naturally cooled, and pulled by a chill roll, thus forming a precursor film. As such, the temperature of the T-die was 200° C., and the lip gap of the T-die was 0.9 mm. The roll was driven at a speed controlled precisely by a Servo motor in the temperature range of 80~130° C.

Comparative Preparative Example 2

5 wt % of ultrahigh molecular weight polyethylene (weight average molecular weight: 2,500,000), 90 wt % of high density polyethylene (weight average molecular weight: 400,000), 3 wt % of Irganox 1010, and 2 wt % of polyethylene wax were blended at room temperature for 1 hour using a Henschel mixer thus preparing a polymer material. The polymer material was melted at 220° C. using a twin-screw extruder, after which the molten polymer resin was fed in a predetermined amount into a cylindrical T-die having a diameter of 50 mm through a melt pump and thus extruded in the form of a tube. The extruded molten resin was forcedly cooled using a circular air ring, and pulled, thus forming a precursor film. As such, the temperature of the T-die was 200° C.

Test Example 1: Evaluation of Properties of Film of Microporous Polymer Membrane The maximum value of a draw ratio which is a ratio of the line speed (m/min) of the molten resin extruded from the T-die and the rotation speed (m/min) of the chill roll in Preparative Example 1 and Comparative Preparative Examples 1 and 2 was measured.

Also, the minimum formable thickness, thickness variation, and crystallinity of the films of Preparative Example 1 and Comparative Preparative Examples 1 and 2 were measured. The results are shown in Table 2 below.

TABLE 2

|  | Preparative Ex. 1 | Com. Preparative. Ex. 1 | Com. Preparative. Ex. 2 |
| --- | --- | --- | --- |
| Max. Draw Ratio | 100 | 10 | 70 |
| Min. Formable Thick. (µm) | 5 | 30 | 9 |
| Thick. Variation (µm) | ±1 | ±5 | ±3 |
| Crystallinity (%) | 20~60 | 50~70 | 30~60 |

As is apparent from Table 2, in Preparative Example 1 the maximum draw ratio is 100, the minimum formable thickness is 5 µm, the thickness variation is ±1 µm, and the crystallinity is 20~60%. This is because the molten resin is forcedly cooled by external air and the air is continuously circulated in the space where the thin film is formed, thus forming the same cooling conditions, and also because the interval between the T-die and the take-up roll may be sufficiently narrowed. Specifically, the shaking of the film resulting from collision with external air is minimized thus increasing the dimensional stability of the precursor film.

However, in the case where the chill roll casting process is used as in Comparative Preparative Example 1, the draw ratio may be 1~10. If the draw ratio is less than 1, the amount extruded from the T-die is increased, undesirably making it impossible to form the film. In contrast, if the draw ratio exceeds 10, the film, which is cooled naturally, is not sufficiently cooled, and the viscosity of the molten resin is high, and thus limitations are imposed on forming a film having a uniform thickness. For this reason, in Comparative Preparative Example 1, the minimum formable thickness is thicker and the thickness variation is larger, compared to in Preparative Example 1.

In Comparative Preparative Example 2, because the air exists in the tube of the precursor film and functions to expand the resin extruded from the cylindrical T-die, too high a winding ratio decreases the dimensional stability of the formed film. Also, because the inner air is continuously heated by cooling heat of the molten resin, it negatively affects the formation of the film. For this reason, in Comparative Preparative Example 2, the minimum formable thickness is thicker and the thickness variation is larger, compared to in Preparative Example 1.

Examples 1 to 5 and Comparative Example 1: Production of Microporous Polymer Membrane The precursor film manufactured in Preparative Example 1 was stretched in both MD and TD using the biaxial extending device of FIG. 1. As such, a MD stretch ratio was fixed, whereas a TD stretch ratio was changed. Thus, changes in thickness of the precursor film are shown in Table 3 below. The precursor film was annealed, primary stretched at room temperature, subjected to secondary stretching including uniaxial dry stretching to 300% in MD using a uniaxial dry stretching device of FIG. 2 (set temp.: 110° C.) and biaxial dry stretching in TD at a stretch ratio shown in Table 3 below, and heat set at a temperature lower than the melting point of the film, thus forming a microporous polymer membrane.

TABLE 3

|  | Stretch Ratio (%) upon Secondary Dry Stretching | Thick. (µm) |
| --- | --- | --- |
| Ex. 1 | 10 | 47 |
| Ex. 2 | 20 | 47 |
| Ex. 3 | 30 | 47 |
| Ex. 4 | 50 | 45 |
| Ex. 5 | 100 | 35 |
| C. Ex. 1 | 0 | 50 |

Test Example 2: Evaluation of Properties of Microporous Polymer Membrane

The tensile strength of the membranes of Examples 1 to 3 and Comparative Example 1 was measured. The results are shown in Table 4 below. The results of Example 5 and Comparative Example 1 are shown in FIGS. 3 and 4.

TABLE 4

|  | Tensile Strength (kgf/cm$^2$) |
| --- | --- |
| Ex. 1 | 512 |
| Ex. 2 | 1,531 |
| Ex. 3 | 2,227 |
| C. Ex. 1 | 351 |

Figure 3:
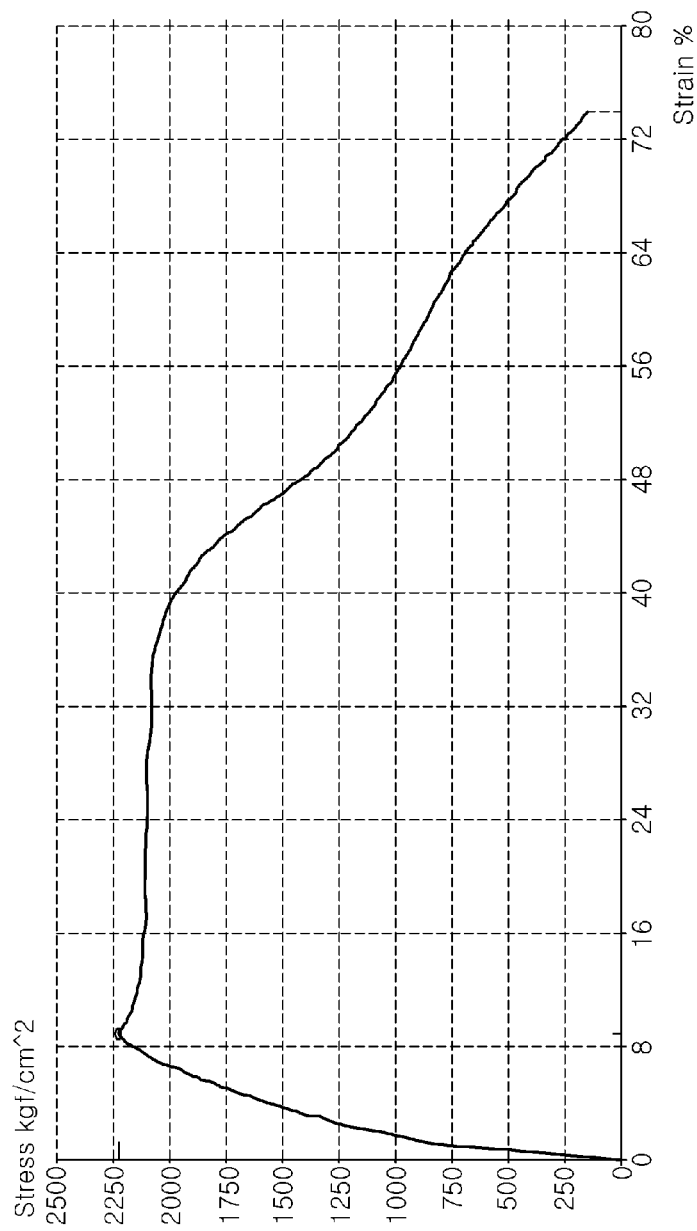
FIG. 3 is a graph showing the tensile strength of the membrane of Example 5.
Figure 4:
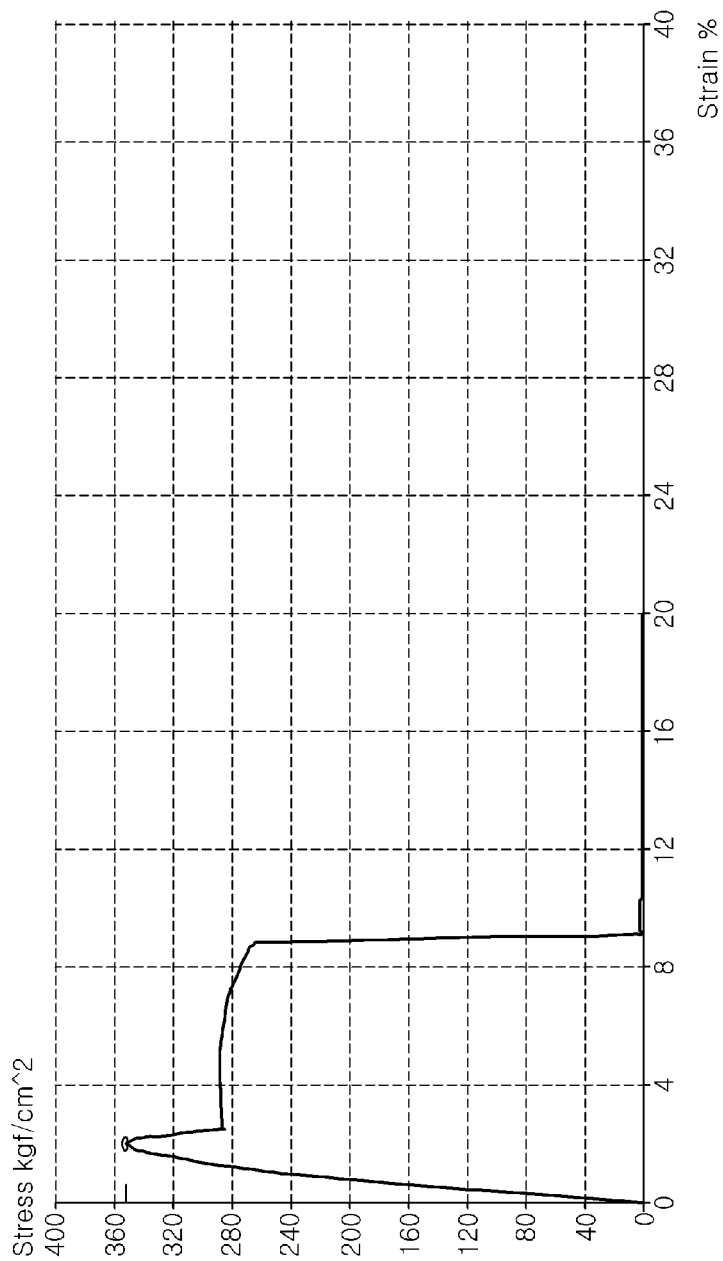
FIG. 4 is a graph showing the tensile strength of the membrane of Comparative Example 1.
Figure 5:
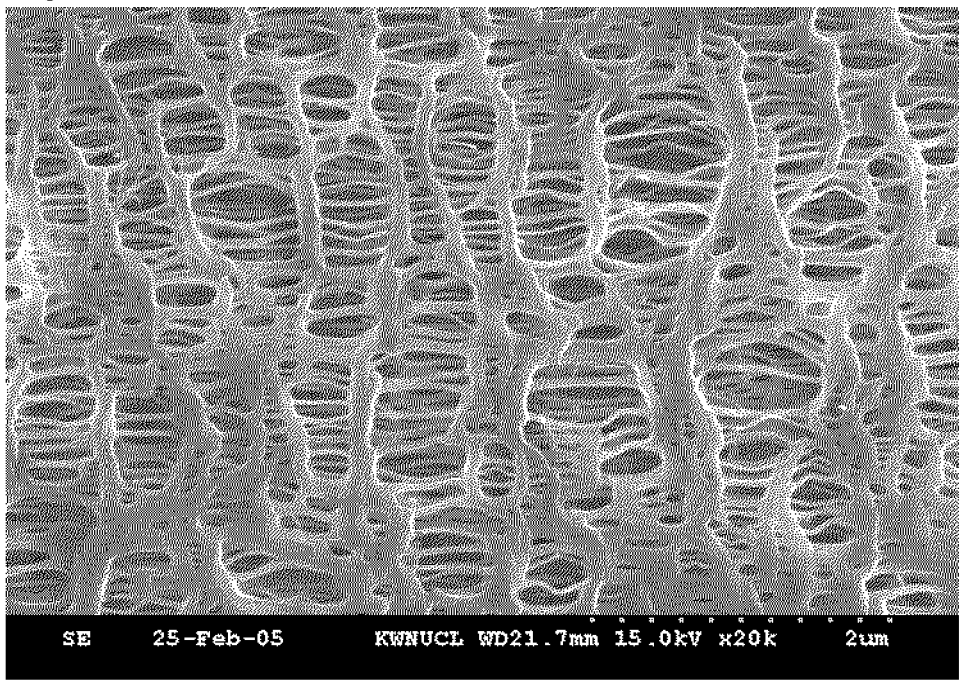
FIG. 5 is a photograph showing the diameter of the pore of the membrane of Example 1.
Figure 6:
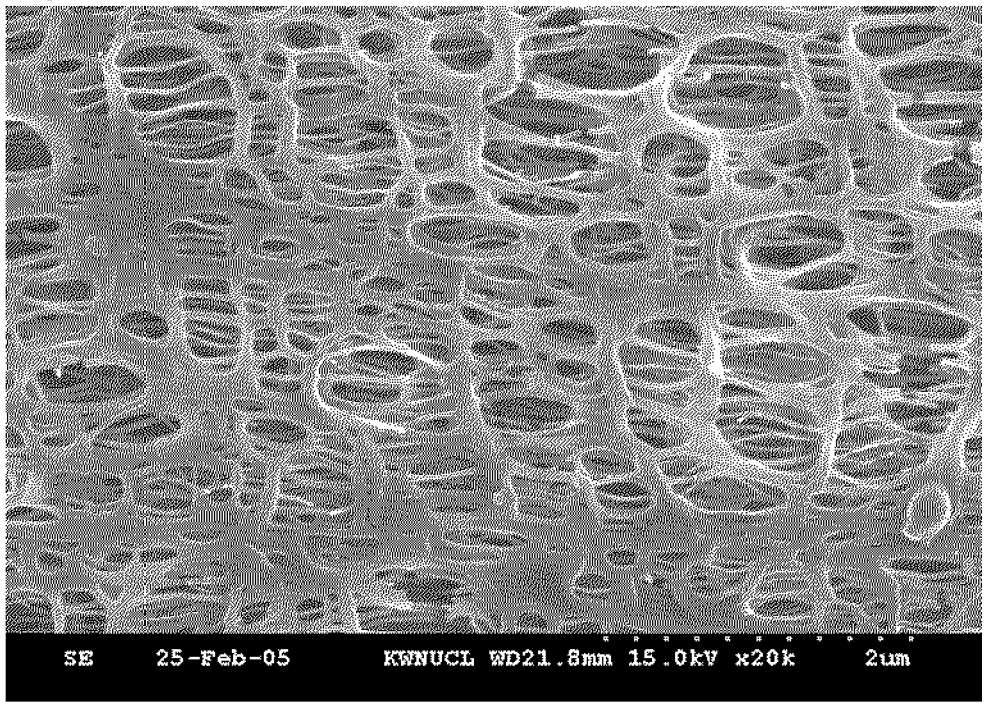
FIG. 6 is a photograph showing the diameter of the pore of the membrane of Example 2.
Figure 7:
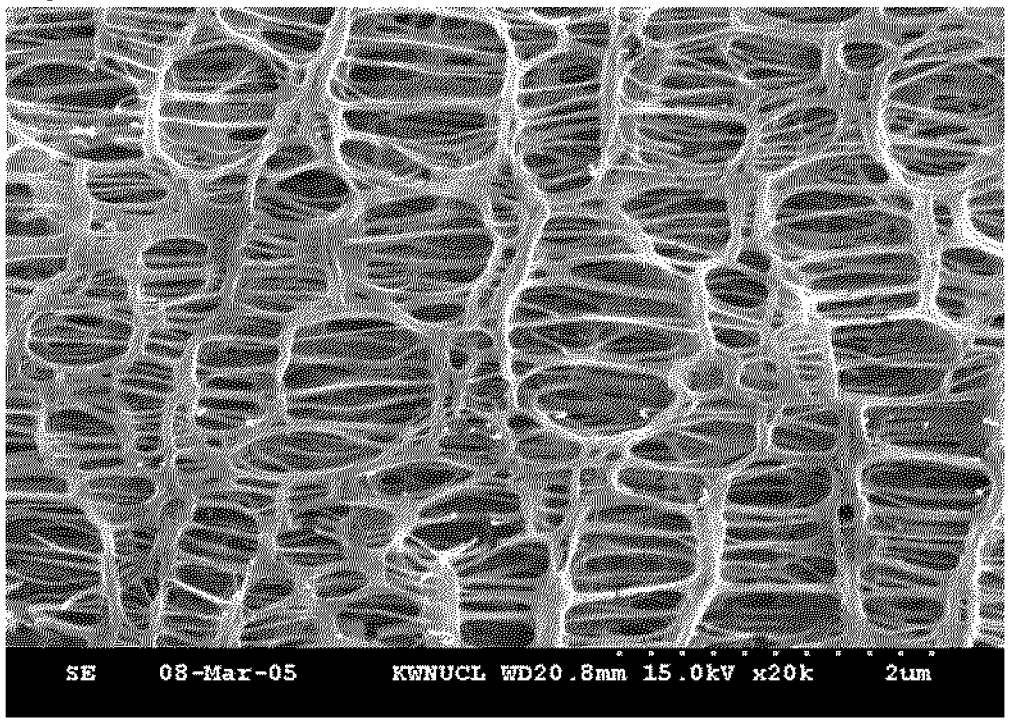
FIG. 7 is a photograph showing the diameter of the pore of the membrane of Example 3.
Figure 8:
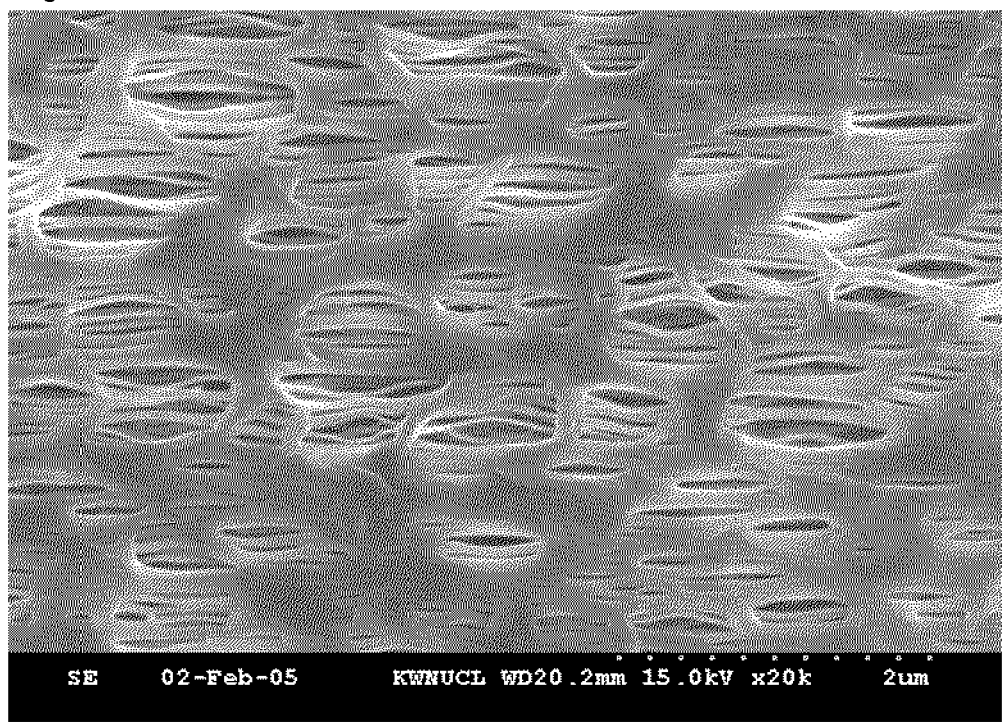
FIG. 8 is a photograph showing the diameter of the pore of the membrane of Comparative Example 1.

As is apparent from Table 4 and FIGS. 3 and 4, after melt extrusion, when biaxial extending is performed compared to when using uniaxial winding of Comparative Example 1, TD tensile strength is larger. Furthermore, TD tensile strength can be seen to increase in proportion to an increase in TD stretch ratio.

Test Example 3

Measurement of a Diameter of a Pore and Porosity of Microporous Polymer Membrane The pore size and porosity of the membranes of Examples 1 to 3 and Comparative Example 1 were measured. The results are shown in Table 5 below, and the SEM images thereof are shown in FIGS. 5 to 8.

TABLE 5

|  | Pore Size (µm) | Porosity (%) |
| --- | --- | --- |
| Ex. 1 | 0.150 | 40.0 |
| Ex. 2 | 0.158 | 70.2 |
| Ex. 3 | 0.180 | 70.8 |
| C. Ex. 1 | 0.039 | 72.2 |

As is apparent from Table 5 and FIGS. 5 to 8, when the stretch ratio upon biaxial stretching at a high temperature is increased, it can be seen that the slit-like pores are changed to be similar to a concentric circle and the porosity becomes higher.

The invention claimed is:
1. A method of producing a microporous polymer membrane based on a dry process, comprising:
   providing a polymer material;
   melting the polymer material;
   extruding the molten polymer material through a T die to obtain a precursor film;

cooling and crystallizing the molten polymer material using an air knife;
extending the precursor film by drawing at a high temperature;
annealing the extended precursor film;
primary uniaxial dry stretching the annealed precursor film at a low temperature at a stretch ratio of 50% to 200%;
forming a preliminary membrane by subjecting the primary stretched film to secondary stretching at a high temperature; and
forming a microporous polymer membrane by heat setting the preliminary membrane,
wherein the extending the precursor film is performed using a biaxial extending device, and
the step of forming the preliminary membrane comprises:
preparing slit-like pores by subjecting the primary stretched film to secondary biaxial dry stretching in a machine direction; and
forming the preliminary membrane by subjecting the film having the slit-like pores to biaxial dry stretching in a transverse direction perpendicular to the machine direction of the uniaxial dry stretching at a stretch ratio of 10%-30%.

2. The method according to claim 1, wherein the preparing slit-like pores is performed using a dry uniaxial stretching device, said device comprising:
a chamber;
a feed roll which is disposed outside the chamber and to feed the film into a stretch roll;
a plurality of the stretch rolls which is disposed to be spaced apart from each other by a predetermined interval at both sides outside the chamber and to feed the film into the chamber from the feed roll; and
a winder which is disposed outside the chamber and to wind the film passed through the stretch rolls.

3. The method according to claim 1, wherein the forming the preliminary membrane is performed using a biaxial extending device.

4. The method according to claim 1, wherein the high temperature for extending the precursor film is about 200° C.

5. The method according to claim 1, wherein the microporous polymer membrane has a porosity of 30% to 70%, a tensile strength of 400 kgf/cm$^2$ to 3,000 kgf/cm$^2$, and a thickness of 10 μm to 50 μm.

6. The method according to claim 1, wherein the microporous polymer membrane has a tensile strength of about 500 kgf/cm$^2$ to 2200 kgf/cm$^2$ in a transverse direction (TD) perpendicular to the machine direction.

7. The method according to claim 1, wherein the polymer material is selected from a group consisting of a ultrahigh molecular weight polyethylene, a high molecular weight polyethylene, a high density polyethylene, a low density polyethylene, a linear low density polyethylene, polypropylene, a high crystalline polypropylene, and a polyethylene-propylene copolymer.

8. The method according to claim 1, wherein the polymer material comprises 5 wt % of a ultrahigh molecular weight polyethylene having a weight average molecular weight of 2,500,000, 90 wt % of a high density polyethylene having a weight average molecular weight of 400,000, 3 wt % of a phenolic antioxidant, and 2 wt % of a polyethylene wax.

9. The method according to claim 1, wherein the air knife sprays an air flow having a temperature of −20° C. to the molten polymer material.

* * * * *